United States Patent
Tanaka et al.

(10) Patent No.: US 12,378,728 B2
(45) Date of Patent: Aug. 5, 2025

(54) COOKING ACCELERATOR FOR LIGNOCELLULOSE MATERIALS AND METHOD FOR PRODUCING PULP USING SAME

(71) Applicant: NICCA CHEMICAL CO., LTD., Fukui (JP)

(72) Inventors: Takashi Tanaka, Fukui (JP); Kouzi Takai, Fukui (JP); Haruhiko Toyohara, Fukui (JP)

(73) Assignee: NICCA CHEMICAL CO., LTD., Fukui (JP)

( * ) Notice: Subject to any disclaimer, the term of this patent is extended or adjusted under 35 U.S.C. 154(b) by 413 days.

(21) Appl. No.: 17/642,120

(22) PCT Filed: Aug. 3, 2020

(86) PCT No.: PCT/JP2020/029628
§ 371 (c)(1),
(2) Date: Oct. 14, 2022

(87) PCT Pub. No.: WO2021/049204
PCT Pub. Date: Mar. 18, 2021

(65) Prior Publication Data
US 2023/0061654 A1    Mar. 2, 2023

(30) Foreign Application Priority Data
Sep. 12, 2019    (JP) ................. 2019-166367

(51) Int. Cl.
*D21C 3/22*    (2006.01)
*D21C 3/00*    (2006.01)

(52) U.S. Cl.
CPC .......... *D21C 3/222* (2013.01); *D21C 3/003* (2013.01)

(58) Field of Classification Search
CPC ......... D21C 3/222; D21C 3/003; D21C 3/006
USPC ....................................................... 162/77
See application file for complete search history.

(56) References Cited

U.S. PATENT DOCUMENTS

| | | | | |
|---|---|---|---|---|
| 514,028 A * | 2/1894 | Phillips | ........... | D21C 3/222 |
| | | | | 162/94 |
| 1,166,848 A * | 1/1916 | Marr | ........... | D21J 1/00 |
| | | | | 162/72 |
| 3,679,543 A * | 7/1972 | Rivers | ........... | D21C 3/228 |
| | | | | 162/49 |
| 4,826,567 A * | 5/1989 | Gratzl | ........... | D21C 3/26 |
| | | | | 162/76 |
| 2019/0112757 A1* | 4/2019 | Jiang | ........... | D21H 11/04 |

FOREIGN PATENT DOCUMENTS

| | | |
|---|---|---|
| GB | 12597 A | 4/1913 |
| JP | H7-145581 A | 6/1995 |
| JP | 2004-143629 A | 5/2004 |
| JP | 2009-185413 A | 8/2009 |
| SU | 1151629 A | 4/1983 |
| WO | 01/59204 A1 | 8/2001 |
| WO | WO-2020084196 A1 * | 4/2020 ............... C07G 1/00 |

OTHER PUBLICATIONS

Gustavsson Maria, The Significance of Liquor-to-Wood Ratio on the Reaction Kinetics of Spruce Sulphate Pulping, 2007, Karlstads. (Year: 2007).*
Elert Glenn, Density of Petroleum, 2007 (downloaded online Sep. 11, 2024), The Physics Factbook. (Year: 2007).*
Saturated steam Table calculator, downloaded online Dec. 18, 2024. (Year: 2024).*
Guangdong School of Light Industry et al. (May 1982). Process and Device for pulp paper., 1st Edition, China Light Industry Press Ltd. vol 1., pp. 195-196.

\* cited by examiner

*Primary Examiner* — Anthony Calandra
(74) *Attorney, Agent, or Firm* — Morrison & Foerster LLP

(57) ABSTRACT

A digestion accelerator which is safe and has a high digestion acceleration effect is provided. The digestion accelerator according to the present invention contains tannin or a polyphenol compound that is a hydrolysate of the tannin, a salt of the polyphenol compound, or ester of the polyphenol compound.

7 Claims, No Drawings

COOKING ACCELERATOR FOR LIGNOCELLULOSE MATERIALS AND METHOD FOR PRODUCING PULP USING SAME

CROSS-REFERENCE TO RELATED APPLICATIONS

This application is a U.S. national stage application under 35 U.S.C. § 371 of International Application No. PCT/JP2020/029628, filed Aug. 3, 2020, which claims the priority of JP Application No. 2019-166367, filed Sep. 12, 2019, the entire contents of each priority application of which is incorporated herein by reference.

FIELD OF THE DISCLOSURE

The present invention relates to a digestion accelerator for a lignocellulose material, and a method for manufacturing pulp using the same.

BACKGROUND OF THE DISCLOSURE

In general, pulp is manufactured from a lignocellulose material of plants such as wood through a digestion treatment using alkali and sulfite. A lignin component and a natural resin component which are unnecessary components are dissolved or dispersed in the digestion treatment, and are then removed by filtration and washing, thereby manufacturing pulp.

In pulp manufacturing, the destructive lumbering of natural resources such as wood is restricted due to environmental issues and other issues, and the price of wood is also increasing. Therefore, it has become important to increase the manufacturing amount of pulp per unit of raw wood and produce pulp products with high quality.

A technique of using a digestion accelerator to enhance efficiency of digestion is known as a method of achieving these objects.

For example, Patent Document 1 provides a method of digesting a lignocellulose material in an alkaline digestion liquid in the presence of a quinone-hydroquinone compound and a precursor thereof, including adding a reductant to this digestion system during a period from a temperature rise to a predetermined digestion temperature to a first half from reaching of the predetermined digestion temperature.

In Patent Document 1, the presence of a quinone-hydroquinone compound and a precursor thereof in the digestion liquid is a precondition. In such a reaction system, the digestion is accelerated by a redox reaction between an oxidized form (anthraquinone) and a reduced form (anthrahydroquinone) of the quinone-hydroquinone compound. Thus, the greater the number of cycles of oxidized and reduced forms, the more suitable the effect of the digestion. The reaction system during digestion is usually biased largely to the oxidized form, and is thus less prone to exhibit a digestion acceleration effect. A reductant is thus used in combination in Patent Document 1 to return the equilibrium to the reduced form, restore the redox cycle, and further increase the digestion acceleration effect by the quinone compound.

Patent Document 2 provides a method of manufacturing pulp using, as a digestion aid for a lignocellulose substance, an organic reducing substance, and describes, as the digestion aid, thiourea, a derivative thereof, and reducing saccharides.

Patent Document 3 provides a digestion aid for digestion of a lignocellulose substance, containing an organic acid and/or a salt thereof. In particular, Patent Document 3 provides a digestion aid containing aminocarboxylic acid and/or oxycarboxylic acid as the organic acid.

PATENT DOCUMENT 1: Japanese Unexamined Patent Publication No. H7-145581
PATENT DOCUMENT 2: Japanese Unexamined Patent Publication No. 2004-143629
PATENT DOCUMENT 3: Japanese Unexamined Patent Publication No. 2009-185413

SUMMARY OF THE DISCLOSURE

However, the quinone-hydroquinone compound, the use of which is a precondition in Patent Document 1, particularly anthraquinone, involves carcinogenic issues and cannot eliminate the influence on the human body. The quinone-hydroquinone compound is thus undesired to be used.

Specifically, the European Food Safety Authority (EFSA) has stated that the carcinogenic action of anthraquinone serving as a pesticide active ingredient cannot be denied, but the possibility that anthraquinone is a hazard to mammals has not been clearly identified. The International Agency for Research on Cancer (IARC) classifies anthraquinone into the group 2B (possibly carcinogenic to humans) class. This has led the German Federal Institute for Risk Assessment (BfR) to exclude anthraquinone from the list of chemicals recommended for use in food packaging.

Even if anthraquinone can be used for applications other than food products, it is operationally difficult to make anthraquinone not be used only in the manufacture of packaging materials for food products because a pulping step including a digestion step branches into each papermaking step in paper mill factories. A digestion aid that does not use anthraquinone is thus desired.

The derivative of thiourea disclosed in Patent Document 2 is insufficient in the digestion acceleration effect; thus, the improvement in the effect is desired.

The organic acid and/or a salt thereof disclosed in Patent Document 3 is insufficient in the digestion acceleration effect; thus, the improvement in the effect is desired.

In view of the foregoing, it is therefore an object of the present invention to provide a digestion accelerator that is safe, and has a high digestion acceleration effect.

A digestion accelerator according to the present invention contains tannin or a polyphenol compound that is a hydrolysate of the tannin, a salt of the polyphenol compound, or ester of the polyphenol compound.

A method for manufacturing pulp according to the present invention includes a digestion step including adding tannin or a polyphenol compound that is a hydrolysate of the tannin, a salt of the polyphenol compound, or ester of the polyphenol compound.

The amount of the tannin or a polyphenol compound that is a hydrolysate of the tannin, a salt of the polyphenol compound, or ester of the polyphenol compound added in the digestion step is preferably 50 ppm or more to 5000 ppm or less relative to the mass of the lignocellulose material.

The present invention can provide a digestion accelerator with which digestion of the lignocellulose material of plants such as wood is accelerated, thereby producing pulp efficiently, and a method for manufacturing pulp using the digestion accelerator, without using a component whose influence on the human body cannot be eliminated.

DETAILED DESCRIPTION OF THE DISCLOSURE

An embodiment of the present invention will now be described in detail. Note that the following description of embodiment is merely an example in nature, and is not intended to limit the scope, applications, or use of the present invention.

Tannin originally means a tanning agent used to tan leather. However, tannin nowadays falls within "a natural polyphenol group having strong affinity for high-molecular-weight compounds such as proteins and polysaccharides, basic compounds such as alkaloid, and heavy metals, and has a property to form complexes with these compounds and heavy metals" (Takashi Yoshida, Tsutomu Hatano, Hideyuki Ito, Journal of Synthetic Organic Chemistry Japan, 62, 5, (2004) p. 95), and is broadly divided into two systems having fundamentally different chemical structures, namely hydrolyzable tannin and condensed tannin. The tannin according to the present embodiment may be either one of hydrolyzable tannin or condensed tannin.

The hydrolyzable tannin is hydrolyzed into a polyphenol compound and a polyhydric alcohol compound (e.g., carbohydrate) with acid, alkali, or enzyme, and is contained in dicotyledonous flower plants. Tannic acid, among others, is commercially available as an isolated reagent.

The polyphenol compound is classified into two main classes, namely gallic acid and a dimer thereof (a released dimer is cyclodehydrated into tetracyclic ellagic acid), which are generally called gallotannin and ellagitannin, respectively.

The condensed tannin is obtained by condensing a plurality of molecules of catechin (a genetic term for d-Catechin, 1-Epicatechin, and 1-Epigallocatechin) with carbon-carbon bonds (usually, bindings at positions 4 and 8 of each catechin skeleton), and contained in not only dicotyledon, but also pteridophyte and monocotyledon. Unlike the hydrolyzable tannin, the condensed tannin cannot be hydrolyzed with acid or alkali.

Each type of tannin contains many phenolic hydroxyl groups in the molecule, and thus can be referred to as polyphenol having a considerably large molecular weight as an acidic organic substance. Substances belonging to tannin have common properties based on polyphenol although their basic structures differ. One of the properties is a property to bind to basic functional groups of biopolymer components such as a protein to aggregate, i.e., convergence action. Because of this property, tannin has been used for tanning.

The tannin is usually extracted from plants. Examples of the hydrolyzable tannin include chestnut, oak, myrabolan, tara, tea, Chinese gall, gallnuts, and tannic acid. Examples of the condensed tannin include quebracho, mimosa (wattle), gambir, and persimmon.

Among them, when the black liquor produced in the digestion step is reused or the digestion step is continuously performed, the condensed tannin is preferably used to be less likely to be decomposed during digestion and maintain the digestion acceleration effect.

In view of the digestion acceleration effect, the hydrolyzable tannin is preferably chestnut, tara, or tannic acid, and the condensed tannin is preferably quebracho or mimosa, more preferably quebracho or mimosa in view of the cost, availability, and continuous use.

The mechanism by which tannin or a polyphenol compound which is a hydrolysate of the tannin functions as a digestion accelerator has not been clarified. However, the present inventors presume as follows.

Patent Document 1 indicates as follows as a mechanism where anthraquinone and anthrahydroquinone each function as a digestion accelerator. "Terminal aldehyde groups of cellulose and hemicellulose are oxidized with anthraquinone (oxidized quinone) to stabilize sugar chains, thereby improving the pulp yield and pulp strength. On the other hand, anthrahydroquinone (reduced quinone) produced by the reduction in this oxidization reaction acts on a β-phenylether bond in a lignin structure which is difficult to be decomposed with caustic soda, whereby the bond is easily cleaved to accelerate a delignification reaction. As a result, the digestion conditions are more relaxed in the case where a quinone compound is added, than the case where the quinone compound is not added. In other words, anthraquinone intervenes in a lignocellulose structure, and functions as a redox catalyst which acts to accelerate the stabilization of sugar and the delignification reaction. Therefore, even a trace amount of anthraquinone exhibits a large auxiliary effect."

The tannin or a polyphenol compound which is a hydrolysate of the tannin has an equivalent chemical structure to hydroquinone. The chemical structure, when oxidized, may possibly be an equivalent chemical structure to quinone. In view of the above, it is presumed that tannin or a polyphenol compound which is a hydrolysate of the tannin accelerates a delignification reaction by a similar mechanism to that of anthraquinone-anthrahydroquinone of Patent Document 1. However, unlike anthraquinone, tannin is a nontoxic substance produced from plants, and thus can be used actively as a digestion accelerator.

The digestion accelerator according to the present embodiment may contain one kind of tannin or a polyphenol compound that is a hydrolysate of the tannin, a salt of the polyphenol compound, or ester of the polyphenol compound, or multiple kinds of them.

The salt of the polyphenol compound can include alkali metal salts (e.g., a sodium salt and a potassium salt) and alkali earth metal salts (e.g., a calcium salt and a magnesium salt) of the polyphenol compound.

The ester of the polyphenol compound is a substance generated from the polyphenol compound by hydrolysis.

The polyphenol compound includes specifically gallic acid, pyrogallol, and ellagic acid. Substances in the forms other than the salt and the ester exhibit the same effect as long as being substances generated from polyphenol compounds by hydrolysis.

The digestion accelerator of the present embodiment may consist of tannin or a polyphenol compound that is a hydrolysate of the tannin, a salt of the polyphenol compound, or ester of the polyphenol compound, or one obtained by adding water or an organic solvent to the tannin or a polyphenol compound that is a hydrolysate of the tannin, a salt of the polyphenol compound, or ester of the polyphenol compound to dissolve or emulsify it or to form an agent in dispersed state. The organic solvent added is not particularly limited, and can be lower alcohols with a carbon number of 1 to 6 such as methanol, ethanol, and propanol; alkylene oxide adducts (1 to 5 mols) of the lower alcohols; alkylene glycols (with a total carbon number of 1 to 6) such as ethylene glycol, diethylene glycol, and propylene glycol; and 3-methyl-3-methoxy butanol.

A natural solvent such as a nonionic surfactant, an anionic surfactant, a cationic surfactant, an amphoteric surfactant, a mineral oil, an organic solvent, and an orange oil may be added to the digestion accelerator according to the present embodiment, in order to impart permeability into and washability of raw materials such as the lignocellulose material.

In addition, an alkali agent may also be added in order to neutralize, with alkali, carboxylic acid of tannin or a polyphenol compound which is a hydrolysate of the tannin to improve ease of dissolving or solubility in water and facilitate commercialization. Examples of the alkali agent include inorganic alkalis such as sodium hydroxide, potassium hydroxide, sodium carbonate, and ammonia; alkanolamines such as triethanolamine, diethanolamine, monoethanolamine, and isopropanolamine; and alkylamines such as isopropylamine and laurylamine. In order to improve the washing efficiency after digestion, an antifoaming agent, a washing agent, and other agents may also be added. Known digestion accelerators (e.g., thiourea and a thiol-based compound) other than a quinone compound such as anthraquinone may further be added as long as the effects of the present embodiment are not impaired.

In light of the digestion acceleration effect and the cost, the total mass of tannin or a polyphenol compound that is a hydrolysate of the tannin, a salt of the polyphenol compound, or ester of the polyphenol compound contained in the digestion accelerator of the present embodiment is preferably 1 mass % or more to 100 mass % or less, more preferably 10 mass % or more to 100 mass % or less, particularly preferably 20 mass % or more to 100 mass % or less, relative to the mass of the digestion accelerator.

Next, a method of manufacturing pulp according to the present embodiment will be described.

The general pulp manufacturing method includes: a digestion step of subjecting a raw material containing a lignocellulose material to a physical treatment with heat or pressure or a chemical treatment with an alkali agent to perform pulping; a step of washing obtained crude pulp; and a step of bleaching washed pulp. In contrast, the method for manufacturing pulp of the present embodiment includes a digestion step including adding a digestion accelerator containing tannin or a polyphenol compound that is a hydrolysate of the tannin, a salt of the polyphenol compound, or ester of the polyphenol compound.

The method for manufacturing pulp according to the present embodiment is effective for manufacturing of a lignin component and a hemicellulose component separated from the lignocellulose material in addition to manufacturing of pulp.

The raw material (lignocellulose material) used in the method for manufacturing pulp according to the present embodiment can be chips of wood (conifer, hardwood) or non-wood. Specific examples of the non-wood include straw, bagasse, reed, kenaf, mulberry, bamboo, herbs, and weeds.

Although not particularly limited thereto, examples of the digestion process to which the digestion accelerator of the present embodiment can be applied include an alkali digestion process and a sulfite digestion process. The alkali digestion process can be a kraft process, a soda process, a sodium carbonate process, or a polysulfide process. The sulfite digestion process can be an alkaline sulfite process, a neutral sulfite process, or a bisulfite process. As chemical for the digestion, a chemical suitable for each process may be used.

A facility for the digestion may be of either a continuous type or a batch type. Further, the facility as the digestion system is applicable to digestion processes such as modified continuous cooking (MCC), isothermal cooking (ITC), low-solids cooking (Lo-solids, reduction in solid contents in a digester), and black liquor impregnation (BLI, use of black liquor in permeation stage).

The timing when the digestion accelerator is added and the process of adding the digestion accelerator in the method for manufacturing pulp of the present embodiment are not particularly limited, but the digestion accelerator may be added in the step including or prior to the digestion step to perform pulping. Specifically, the digestion accelerator of the present embodiment may be added directly to a digester prior to digestion or during the digestion step, may be mixed with a chemical for digestion, may be sprayed on the lignocellulose material such as wood chips before digestion, or may be added to a circulating black liquor in a case where the facility for the digestion is of a continuous type.

The digestion accelerator of the present invention may be used as it is, or may be used after being dissolved in, emulsified in, dispersed in, or diluted with a solvent such as water and an organic solvent. The solvent used can be any solvent shown as a component of the digestion accelerator. In addition, an alkali agent may also be used in combination in order to neutralize, with alkali, carboxylic acid of tannin or a polyphenol compound which is a hydrolysate of the tannin to improve ease of dissolving or solubility in water and facilitate usability. Examples of the alkali agent include inorganic alkalis such as sodium hydroxide, potassium hydroxide, sodium carbonate, and ammonia; alkanolamines such as triethanolamine, diethanolamine, monoethanolamine, and isopropanolamine; and alkylamines such as isopropylamine and laurylamine. A natural solvent such as a nonionic surfactant, an anionic surfactant, a cationic surfactant, an amphoteric surfactant, a mineral oil, an organic solvent, or an orange oil, and the alkali agent may be used in combination with the digestion accelerator according to the present embodiment, in order to impart permeability into and washability of the lignocellulose material such as wood. In order to improve the washing efficiency after digestion, an antifoaming agent, a washing agent, and other agents may also be used in combination. Known digestion accelerators (e.g., thiourea and a thiol-based compound) other than a quinone compound such as anthraquinone may further be used in combination as long as the effects of the present embodiment are not impaired.

In light of the decomposition effect and the cost, as the amount of the digestion accelerator of the present embodiment used, the total mass of the tannin or a polyphenol compound that is a hydrolysate of the tannin used is preferably 50 ppm or more to 5000 ppm or less, more preferably 60 ppm or more to 3000 ppm or less, particularly preferably 100 ppm or more to 1000 ppm or less relative to the dry mass of the lignocellulose material, which is a raw material. If the digestion accelerator contains a salt of the polyphenol compound or ester of the polyphenol compound, the mass of the polyphenol compound produced by hydrolysis, which is a conversion value, is used as the amount of the salt or ester used. Also in the case where the black liquor is reused, the total mass of the tannin or a polyphenol compound that is a hydrolysate of the tannin is preferably within the above concentration range relative to the dry mass of the lignocellulose material, which is a raw material.

The lignocellulose material, which is a raw material, may contain tannin. Even if the lignocellulose material contains tannin, the content of the tannin in the digestion step is lower than that of the present embodiment, or a high-molecular-weight tannin considered to serve effectively to accelerate digestion is less prone to be extracted from the lignocellulose material, which is a raw material, in the digestion step, and a low-molecular-weight tannin which is not so effective is extracted in a liquid used in the digestion step. The tannin which may be contained in the lignocellulose material is not effective for acceleration of digestion. In fact, the black liquor obtained in a digestion step during which the digestion accelerator is not added shows no digestion acceleration effect. However, in the present embodiment, tannin or a polyphenol compound which is a hydrolysate of the tannin is added in the digestion step. The tannin or polyphenol compound serves as a digestion accelerator to accelerate digestion from the beginning. This exhibits a significant digestion acceleration effect.

The process temperature for digestion differs depending on intended pulp products and is not limited, but is preferably 50° C. to 300° C., more preferably 80° C. to 250° C.

The process pressure for digestion differs depending on intended pulp products and is not limited, but is preferably normal pressure to 10 MPa, more preferably normal pressure to 5 MPa.

Oxygen may be introduced into a digester to perform the digestion step. The process of introducing oxygen is not particularly limited, but oxygen may be injected into the digester by setting the oxygen partial pressure to be high while the pressure of the digester is controlled using oxygen or air, or oxygen may be injected when wood chips or a digestion liquid is supplied. In some cases, oxidizing agents which may produce oxygen under the digestion conditions, namely peroxides such as hydrogen peroxide and potassium peroxide, and peroxides such as sodium percarbonate and peracetic acid may be added to a digestion liquid.

For injection of oxygen, oxygen is injected such that the oxygen partial pressure is 0.05 MPa to 1 MPa, preferably 0.1 MPa to 0.3 MPa As the oxygen source, air or a mixed gas of oxygen and air is used besides pure oxygen. The oxygen source is not limited as long as the oxygen partial pressure is kept within the above range. However, the increase in the pressure resistance of the device increases the cost of the device; thus the oxygen source used is preferably pure oxygen or a mixed gas of oxygen and air.

The present invention will be described in more detail below with reference to Examples, but the present invention is not limited to these Examples.

Tap water was added to a mixture of 50 g of wood chips of hardwood dried at 105° C. for 10 hours and 16 g of sodium hydroxide (reagent) so that the total amount was 200 g. To the resultant mixture, 0.015 g of chestnut (manufactured by Kawamura & Co., Ltd.) (0.03 mass % relative to the wood chips) was added, which was then placed in a pot of a mini-color dying tester (manufactured by Texam) and digested at 155° C. for 2 hours (digestion step). Thus, pulp and undegraded wood chips were obtained.

After cooling, the digested pulp and undegraded wood chips were thoroughly loosened, and then filtered repeatedly with a No. 2 filter paper until the color of the filtrate disappeared (washing step). A mixture of the pulp and undegraded wood chips, which are filtration residues obtained after the washing, was passed through 6/1000 inch flat screens (manufactured by Kumagai Riki Kogyo Co., Ltd.) (6 cuts).

The undigested wood chips which had not been passed through the flat screens were recovered and dried at 105° C. for 10 hours. Then, the mass of the resultant wood chips were measured as "the amount (g) of the wood chips recovered on the flat screens," and the residual rate (%) of the wood chips was calculated based on the following equation.

The residual rate (%) of wood chips=[the amount (g) of wood chips recovered on flat screens/the amount of digested wood chips (50 g)]×100

The liquid that had passed through the flat screens was then passed through a 200-mesh wire net. Subsequently, the pulp which had not been passed through the 200-mesh wire net was recovered and dried at 105° C. for 10 hours. Then, the mass of the pulp was measured as "the amount (g) of the pulp recovered on the 200-mesh wire net." The yield rate (%) of the pulp was calculated based on the following equation.

The yield rate (%) of the pulp=[the amount (g) of the pulp recovered on the 200-mesh wire net/ the amount of the digested wood chips (50 g)]× 100

The Kappa number of the obtained pulp was measured in accordance with the method described in JIS P 8211 (2011).

The residual rate of the wood chips of 10% or less was regarded as acceptable, and the yield rate of the pulp of 40% or more was regarded as acceptable. A lower Kappa number is preferred. Table 1 shows the results.

TABLE 1

| Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 1 | Chestnut (manufactured by | 0.03 | 9.3 | 40.3 | 21.3 |
| 2 | Kawamura Corporation) | 0.06 | 6.3 | 43.1 | 19.8 |
| 3 |  | 0.10 | 5.0 | 44.5 | 19.2 |
| 4 |  | 0.20 | 4.2 | 45.1 | 18.8 |
| 5 | Quebracho (manufactured by | 0.03 | 9.8 | 39.9 | 21.5 |
| 6 | Kawamura Corporation) | 0.06 | 7.0 | 42.6 | 20.0 |
| 7 |  | 0.10 | 5.8 | 43.5 | 19.6 |
| 8 |  | 0.20 | 4.7 | 44.7 | 19.1 |
| 9 | Tannic Acid (Reagent) | 0.10 | 5.2 | 44.3 | 19.3 |
| 10 | Mimosa (manufactured by Kawamura Corporation) | 0.10 | 5.8 | 43.8 | 19.5 |
| 11 | Tara (manufactured by Kawamura Corporation) | 0.10 | 5.0 | 44.6 | 19.0 |
| 12 | Myrabolan (manufactured by Kawamura Corporation) | 0.10 | 5.8 | 43.7 | 19.6 |
| 13 | Gambier (manufactured by Kawamura Corporation) | 0.10 | 6.2 | 43.2 | 19.8 |
| 14 | Pyrogallol (Reagent) | 0.10 | 8.4 | 41.1 | 20.8 |

TABLE 1-continued

| Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 15 | Gallic Acid (Gallic acid monohydrate is used, Reagent) | 0.10 | 9.1 | 40.4 | 21.3 |
| 16 | Ellagic Acid (Ellagic acid dihydrate is used, Reagent) | 0.10 | 9.6 | 39.0 | 21.8 |

In Examples 2 to 16, the same processes as those in Example 1 were performed except that compounds shown in Table 1 were used as a digestion accelerator in the amounts shown in Table 1. Then, the residual rates of the wood chips, and the yield rates and Kappa numbers of the pulp were determined. Table 1 shows the results (note that in Example 15, gallic acid monohydrate was used, and 0.10 mass % of gallic acid was added as a pure content: hereinafter, the same applies to other hydrates). Table 1 shows the results of Examples obtained by the soda process using hardwood.

In Comparative Example 1, the same processes as those in Example 1 were performed except that the digestion accelerator was not added. Then, the residual rate of the wood chips and the yield rate and Kappa number of the pulp were determined. Table 2 shows the results.

TABLE 2

| Comp. Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 1 | None | None | 20.8 | 28.9 | 27.7 |
| 2 | DL-Malic Acid (manufactured by NACALAI TESQUE, INC.) | 0.10 | 17.2 | 32.2 | 22.9 |
| 3 |  | 0.20 | 14.1 | 35.6 | 23.5 |
| 4 | Tripotassium Citrate (Tripotassium Citrate Monohydrate manufactured by NACALAI TESQUE, INC. was used) | 0.10 | 16.7 | 32.9 | 25.4 |
| 5 |  | 0.20 | 14.6 | 34.9 | 24.1 |
| 6 | Dipotassium Ethylenediaminetetraacetate (manufactured by NACALAI TESQUE, INC.) | 0.10 | 18.2 | 31.4 | 26.5 |
| 7 |  | 0.20 | 14.8 | 34.8 | 24.3 |
| 8 | Glycolic Acid (Reagent) | 0.10 | 16.8 | 32.7 | 25.5 |
| 9 |  | 0.20 | 13.3 | 36.4 | 23.2 |
| 10 | Lithium Lactate (manufactured by NACALAI TESQUE, INC.) | 0.10 | 17.1 | 32.6 | 25.5 |
| 11 |  | 0.20 | 13.9 | 35.8 | 23.5 |

In Comparative Examples 2 to 11, the same processes as those in Example 1 were performed except that compounds shown in Table 2 were used as a digestion accelerator in the amounts shown in Table 2. Then, the residual rates of the wood chips and the yield rates and Kappa numbers of the pulp were determined. Table 2 shows the results. Table 2 shows the results of Comparative Examples obtained by the soda process using hardwood.

Tap water was added to a mixture of 50 g wood chips of hardwood dried at 105° C. for 10 hours, 5 g of the pure content (the content without moisture) of sodium sulfide as sodium sulfide pentahydrate (reagent), and 12 g of sodium hydroxide (reagent) so that the total amount was 200 g. To the resultant mixture, 0.015 g of tannic acid (reagent) (0.03 mass % relative to the wood chips) was added, which was then placed in a pot of a mini-color dying tester (manufactured by Texam) and digested at 155° C. for 1 hour (digestion step). Thus, pulp and undegraded wood chips were obtained.

Subsequently, the same processes as those in Example 1 were performed, and the residual rate of the wood chips and the yield rate and Kappa number of the pulp were determined. Table 3 shows the results.

TABLE 3

| Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 17 | Tannic Acid | 0.03 | 6.7 | 42.7 | 20.0 |
| 18 |  | 0.06 | 3.2 | 46.3 | 18.4 |
| 19 |  | 0.10 | 1.0 | 48.5 | 17.0 |
| 20 |  | 0.20 | 0.7 | 48.6 | 17.0 |
| 21 | Quebracho | 0.03 | 7.0 | 42.4 | 20.3 |

TABLE 3-continued

| Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 22 |  | 0.06 | 3.4 | 46.2 | 18.5 |
| 23 |  | 0.10 | 1.1 | 48.3 | 17.3 |
| 24 |  | 0.20 | 0.8 | 48.5 | 17.1 |
| 25 | Chestnut | 0.10 | 1.2 | 48.3 | 17.3 |
| 26 | Mimosa | 0.10 | 1.5 | 48.0 | 17.4 |
| 27 | Tara | 0.10 | 2.0 | 47.5 | 17.6 |
| 28 | Myrabolan | 0.10 | 2.5 | 47.0 | 18.0 |
| 29 | Gambier | 0.10 | 2.7 | 46.7 | 18.1 |
| 30 | Pyrogallol | 0.10 | 4.3 | 45.3 | 18.9 |
| 31 | Gallic Acid | 0.10 | 4.7 | 44.6 | 19.1 |
| 32 | Ellagic Acid | 0.10 | 5.0 | 44.0 | 19.4 |

In Examples 18 to 32, the same processes as those in Example 17 were performed except that compounds shown in Table 3 were used as a digestion accelerator in the amounts shown in Table 3. Then, the residual rates of the wood chips, and the yield rates and Kappa numbers of the pulp were determined. Table 3 shows the results. Table 3 shows the results of Examples obtained by the kraft process using hardwood.

In Examples 33 to 48, the same processes as those in Example 17 were performed except that the wood chips were changed from hardwood to softwood, and compounds shown in Table 4 were used as a digestion accelerator in the amounts shown in Table 4. Then, the residual rates of the wood chips, and the yield rates and Kappa numbers of the pulp were determined. Table 4 shows the results. Table 4 shows the results of Examples obtained by the kraft process using softwood.

TABLE 4

| Ex. | Digestion Accelerator | Amount Used (mass %/ Wood Chips) | Residual Rate of Wood Pieces (%) | Yield Rate of Pulp (%) | Kappa Number of Pulp |
|---|---|---|---|---|---|
| 33 | Tannic Acid | 0.03 | 7.0 | 42.0 | 20.4 |
| 34 | | 0.06 | 3.8 | 45.3 | 18.8 |
| 35 | | 0.10 | 1.7 | 47.3 | 17.9 |

TABLE 4-continued

| Ex. | Digestion Accelerator | Amount Used (mass %/ Wood Chips) | Residual Rate of Wood Pieces (%) | Yield Rate of Pulp (%) | Kappa Number of Pulp |
|---|---|---|---|---|---|
| 36 | | 0.20 | 0.9 | 48.0 | 17.4 |
| 37 | Quebracho | 0.03 | 7.2 | 41.9 | 20.5 |
| 38 | | 0.06 | 4.0 | 45.0 | 18.9 |
| 39 | | 0.10 | 1.8 | 47.0 | 18.0 |
| 40 | | 0.20 | 0.9 | 48.0 | 17.4 |
| 41 | Chestnut | 0.10 | 1.8 | 47.1 | 17.9 |
| 42 | Mimosa | 0.10 | 2.2 | 46.8 | 18.0 |
| 43 | Tara | 0.10 | 2.1 | 46.8 | 18.1 |
| 44 | Myrabolan | 0.10 | 3.2 | 45.8 | 18.5 |
| 45 | Gambier | 0.10 | 3.0 | 45.8 | 18.6 |
| 46 | Pyrogallol | 0.10 | 5.0 | 44.0 | 19.3 |
| 47 | Gallic Acid | 0.10 | 5.5 | 43.6 | 19.5 |
| 48 | Ellagic Acid | 0.10 | 5.6 | 43.5 | 19.6 |

In Comparative Example 12, the same processes as those in Example 17 were performed except that the digestion accelerator was not added. Then, the residual rate of the wood chips and the yield rate and Kappa number of the pulp were determined. Table 5 shows the results.

TABLE 5

| Comp. Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 12 | None | None | 15.9 | 33.7 | 24.7 |
| 13 | DL-Malic Acid | 0.10 | 12.8 | 36.9 | 22.8 |
| 14 | | 0.20 | 10.4 | 39.2 | 21.7 |
| 15 | Tripotassium Citrate | 0.10 | 13.5 | 36.0 | 23.1 |
| 16 | | 0.20 | 11.1 | 38.5 | 22.0 |
| 17 | Dipotassium Ethylenediaminetetraacetate | 0.10 | 13.0 | 36.8 | 23.0 |
| 18 | | 0.20 | 10.3 | 39.3 | 21.6 |
| 19 | Glycolic Acid | 0.10 | 13.4 | 36.3 | 23.2 |
| 20 | | 0.20 | 11.0 | 38.5 | 21.9 |
| 21 | Lithium Lactate | 0.10 | 14.8 | 34.8 | 24.0 |
| 22 | | 0.20 | 11.7 | 37.9 | 22.3 |

In Comparative Examples 13 to 22, the same processes as those in Example 17 were performed except that compounds shown in Table 5 were used as a digestion accelerator in the amounts shown in Table 5. Then, the residual rates of the wood chips and the yield rates and Kappa numbers of the pulp were determined. Table 5 shows the results. Table 5 shows the results of Comparative Examples obtained by the kraft process using hardwood.

In Comparative Example 23, the same processes as those in Example 17 were performed except that the wood chips were changed from hardwood to softwood, and the digestion accelerator was not added. Then, the residual rate of the wood chips and the yield rate and Kappa number of the pulp were determined. Table 6 shows the results.

TABLE 6

| Comp. Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 23 | None | None | 16.4 | 32.9 | 25.4 |
| 24 | DL-Malic Acid | 0.10 | 12.4 | 37.0 | 22.8 |
| 25 | | 0.20 | 10.8 | 38.4 | 22.3 |
| 26 | Tripotassium Citrate | 0.10 | 13.6 | 35.5 | 23.5 |
| 27 | | 0.20 | 11.4 | 37.7 | 22.5 |
| 28 | Dipotassium Ethylenediaminetetraacetate | 0.10 | 13.3 | 35.9 | 23.5 |
| 29 | | 0.20 | 10.6 | 38.5 | 22.0 |
| 30 | Glycolic Acid | 0.10 | 13.8 | 35.3 | 23.9 |
| 31 | | 0.20 | 11.4 | 37.7 | 22.6 |

TABLE 6-continued

| Comp. Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 32 | Lithium Lactate | 0.10 | 14.7 | 34.5 | 24.2 |
| 33 | | 0.20 | 12.0 | 37.0 | 22.8 |

In Comparative Examples 24 to 33, the same processes as those in Example 17 were performed except that the wood chips were changed from hardwood to softwood, and compounds shown in Table 6 were used as a digestion accelerator in the amounts shown in Table 6. Then, the residual rates of the wood chips, and the yield rates and Kappa numbers of the pulp were determined. Table 6 shows the results. Table 6 shows the results of Comparative Examples obtained by the kraft process using softwood.

Tap water was added to a mixture of 50 g wood chips of softwood dried at 105° C. for 10 hours, 2.8 g of the pure content (the content without moisture) of sodium sulfide as sodium sulfide pentahydrate (reagent), 12 g of sodium hydroxide (reagent), and 1.2 g of the pure content (the content without moisture) of sodium tetrasulfide as a sodium tetrasulfide solution (manufactured by Nagao Co., Ltd.) so that the total amount was 200 g. To the resultant mixture, 0.015 g of quebracho (manufactured by Kawamura & Co., Ltd.) (0.03 mass % relative to the wood chips) was added, which was then placed in a pot of a mini-color dying tester (manufactured by Texam) and digested at 155° C. for 1 hour (digestion step). Thus, pulp and undegraded wood chips were obtained.

Subsequently, the same processes as those in Example 1 were performed, and the residual rate of the wood chips and the yield rate and Kappa number of the pulp were determined. Table 7 shows the results.

TABLE 7

| Ex. | Digestion Accelerator | Amount Used (mass %/ Wood Chips) | Residual Rate of Wood Pieces (%) | Yield Rate of Pulp (%) | Kappa Number of Pulp |
|---|---|---|---|---|---|
| 49 | Quebracho | 0.03 | 6.3 | 42.8 | 20.1 |
| 50 | | 0.06 | 3.4 | 45.6 | 18.5 |
| 51 | | 0.10 | 1.3 | 47.5 | 17.6 |
| 52 | Mimosa | 0.03 | 6.7 | 42.3 | 20.4 |
| 53 | | 0.06 | 3.8 | 45.2 | 18.8 |
| 54 | | 0.10 | 1.6 | 47.3 | 17.9 |
| 55 | Tannic Acid | 0.10 | 1.4 | 47.6 | 17.6 |
| 56 | Chestnut | 0.10 | 1.5 | 47.5 | 17.6 |
| 57 | Tara | 0.10 | 1.8 | 47.2 | 17.9 |
| 58 | Myrabolan | 0.10 | 2.4 | 46.4 | 18.3 |
| 59 | Gambier | 0.10 | 2.5 | 46.4 | 18.4 |
| 60 | Pyrogallol | 0.10 | 4.0 | 44.9 | 19.0 |

TABLE 7-continued

| Ex. | Digestion Accelerator | Amount Used (mass %/ Wood Chips) | Residual Rate of Wood Pieces (%) | Yield Rate of Pulp (%) | Kappa Number of Pulp |
|---|---|---|---|---|---|
| 61 | Gallic Acid | 0.10 | 4.9 | 44.2 | 19.3 |
| 62 | Ellagic Acid | 0.10 | 4.8 | 44.2 | 19.4 |

In Examples 50 to 62, the same processes as those in Example 49 were performed except that compounds shown in Table 7 were used as a digestion accelerator in the amounts shown in Table 7. Then, the residual rates of the wood chips and the yield rates and Kappa numbers of the pulp were determined. Table 7 shows the results. Table 7 shows the results of Examples obtained by the polysulfide process using softwood.

In Comparative Example 34, the same processes as those in Example 49 were performed except that the digestion accelerator was not added. Then, the residual rate of the wood chips and the yield rate and Kappa number of the pulp were determined. Table 8 shows the results.

TABLE 8

| Comp. Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 34 | None | None | 15.0 | 34.0 | 24.6 |
| 35 | DL-Malic acid | 0.10 | 11.8 | 37.4 | 22.7 |
| 36 | Tripotassium Citrate | 0.10 | 12.2 | 36.8 | 23.1 |
| 37 | Dipotassium Ethylenediaminetetraacetate | 0.10 | 12.4 | 36.6 | 23.1 |
| 38 | Glycolic Acid | 0.10 | 12.7 | 36.5 | 23.2 |
| 39 | Tripotassium Citrate Monohydrate | 0.10 | 13.8 | 35.3 | 23.8 |

In Comparative Examples 35 to 39, the same processes as those in Example 49 were performed except that compounds shown in Table 8 were used as a digestion accelerator in the amounts shown in Table 8. Then, the residual rates of the wood chips and the yield rates and Kappa numbers of the pulp were determined. Table 8 shows the results. Table 8 shows the results of Comparative Examples obtained by the polysulfide process using softwood.

Tap water was added to a mixture of 50 g wood chips of softwood dried at 105° C. for 10 hours, 5 g of the pure content (the content without moisture) of sodium sulfide as sodium sulfide pentahydrate (reagent), and 12 g of sodium hydroxide (reagent) so that the total amount was 200 g. To the resultant mixture, 0.015 g of quebracho (manufactured by Kawamura & Co., Ltd.) (0.03 mass % relative to the wood chips) was added, which was then placed in a pot of a mini-color dying tester (manufactured by Texam) and digested at 155° C. for 20 minutes (digestion step). Subsequently, the mixture was returned to room temperature and room pressure, and oxygen was introduced into the system by opening the lid of the pot and replacing air. The process described above was regarded as one cycle of digestion, and a total of three cycles of digestion were performed on the same components placed in the pot. Thus, pulp and undegraded wood chips were obtained.

Subsequently, the same processes as those in Example 1 were performed, and the residual rate of the wood chips and the yield rate and Kappa number of the pulp were determined. Table 9 shows the results.

TABLE 9

| Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 63 | Quebracho | 0.03 | 5.0 | 44.1 | 19.2 |
| 64 | | 0.10 | 1.2 | 47.7 | 17.4 |
| 65 | Mimosa | 0.10 | 1.5 | 47.3 | 17.6 |
| 66 | Tannic Acid | 0.10 | 1.2 | 47.7 | 17.4 |
| 67 | Chestnut | 0.10 | 1.3 | 47.7 | 17.4 |
| 68 | Tara | 0.10 | 1.6 | 47.3 | 17.7 |
| 69 | Pyrogallol | 0.10 | 3.7 | 45.4 | 18.5 |
| 70 | Gallic Acid | 0.10 | 4.0 | 45.0 | 18.7 |
| 71 | Ellagic Acid | 0.10 | 4.1 | 45.0 | 18.8 |

In Examples 64 to 71, the same processes as those in Example 63 were performed except that compounds shown in Table 9 were used as a digestion accelerator in the amounts shown in Table 9. Then, the residual rates of the wood chips and the yield rates and Kappa numbers of the pulp were determined. Table 9 shows the results. Table 9 shows the results of Examples obtained by the kraft process with air replacement using softwood.

In Comparative Example 40, the same processes as those in Example 63 were performed except that the digestion accelerator was not added. Then, the residual rate of the wood chips and the yield rate and of the pulp were determined. Table 10 shows the results.

TABLE 10

| Comp. Ex. | Digestion Accelerator | Amount Used (mass %/Wood Chips) | Residual Rate of Wood Pieces (%) | Yield Rate of Pulp (%) | Kappa Number of Pulp |
|---|---|---|---|---|---|
| 40 | None | None | 16.0 | 33.2 | 25.3 |
| 41 | Glycolic Acid | 0.10 | 12.9 | 36.2 | 23.4 |
| 42 | Lithium Lactate | 0.10 | 13.9 | 35.2 | 23.9 |
| 43 | DL-Malic Acid | 0.10 | 12.0 | 37.2 | 22.9 |

In Comparative Examples 41 to 43, the same processes as those in Example 63 were performed except that compounds shown in Table 10 were used as a digestion accelerator in the amounts shown in Table 10. Then, the residual rates of the wood chips and the yield rates and Kappa numbers of the pulp were determined. Table 10 shows the results. Table 10 shows the results of Comparative Examples obtained by the kraft process with air replacement using softwood.

The same digestion as in Comparative Example 12 was first performed (digestion step). After cooling, the digested pulp and undegraded wood chips were thoroughly loosened using a chemistirrer, and then filtered with a No. 2 filter paper. Thus, a liquid without using the digestion accelerator (hereinafter referred to as a black liquor) was obtained.

Then, tap water was added to a mixture of 50 g wood chips of hardwood dried at 105° C. for 10 hours, 2.5 g of the pure content (the content without moisture) of sodium sulfide as sodium sulfide pentahydrate (reagent), 6 g of sodium hydroxide (reagent), and 75 g of black liquor obtained in the previous process so that the total amount was 200 g. To the resultant mixture, 0.015 g of quebracho (manufactured by Kawamura & Co., Ltd.) (0.03 mass % relative to the wood chips) was added, which was then placed in a pot of a mini-color dying tester (manufactured by Texam) and digested at 155° C. for 1 hour (digestion step). Thus, pulp and undegraded wood chips were obtained.

Subsequently, the same processes as those in Example 1 were performed, and the residual rate of the wood chips and the yield rate and Kappa number of the pulp were determined. Table 11 shows the results.

TABLE 11

| Ex. | Black Liquor Used | Digestion Accelerator | Amount Used (mass %/Wood Chips) | Residual Rate of Wood Pieces (%) | Yield Rate of Pulp (%) | Kappa Number of Pulp |
|---|---|---|---|---|---|---|
| 72 | Black Liquor obtained in Com. Ex. 12 | Quebracho | 0.03 | 7.6 | 41.9 | 20.4 |
| 73 | | | 0.06 | 3.8 | 45.5 | 18.6 |
| 74 | | | 0.10 | 1.7 | 47.6 | 17.3 |
| 75 | | Chestnut | 0.03 | 7.8 | 41.7 | 20.6 |
| 76 | | | 0.06 | 3.6 | 45.9 | 18.4 |
| 77 | | | 0.10 | 1.7 | 47.7 | 17.5 |
| 78 | | Mimosa | 0.03 | 7.9 | 41.6 | 20.6 |
| 79 | | | 0.06 | 4.0 | 45.5 | 18.6 |
| 80 | | | 0.10 | 1.9 | 47.5 | 17.7 |
| 81 | | Pyrogallol | 0.10 | 4.6 | 44.9 | 19.0 |
| 82 | | Gallic Acid | 0.10 | 5.1 | 44.3 | 19.4 |

In Examples 73 to 82, the same processes as those in Example 72 were performed except that compounds shown in Table 11 were used as a digestion accelerator in the amounts shown in Table 11. Then, the residual rates of the wood chips, and the yield rates and Kappa numbers of the pulp were determined. Table 11 shows the results. Table 11 shows the results of Examples obtained by the kraft process using the black liquor after the digestion by the kraft process without using the digestion accelerator using the hardwood.

In Examples 83 to 93, the same processes as those in Example 72 were performed except that the wood chips were changed to softwood, and compounds shown in Table 12 were used as a digestion accelerator in the amounts shown in Table 12. Then, the residual rates of the wood chips, and the yield rates and Kappa numbers of the pulp were determined. Table 12 shows the results. Table 12 shows the results of Examples obtained by the kraft process using the black liquor after the digestion by the kraft process without using the digestion accelerator using softwood.

TABLE 12

| Examples | Black Liquor Used | Digestion Accelerator | Amount Used (mass %/Wood Chips) | Residual Rate of Wood Pieces (%) | Yield Rate of Pulp (%) | Kappa Number of Pulp |
|---|---|---|---|---|---|---|
| 83 | Black Liquor obtained in Comp. Ex. 12 | Quebracho | 0.03 | 7.7 | 41.4 | 20.7 |
| 84 | | | 0.06 | 4.8 | 44.1 | 19.2 |
| 85 | | | 0.10 | 2.3 | 46.7 | 18.0 |
| 86 | | Chestnut | 0.03 | 7.9 | 41.0 | 20.8 |
| 87 | | | 0.06 | 5.0 | 44.0 | 19.4 |
| 88 | | | 0.10 | 2.5 | 46.4 | 18.3 |
| 89 | | Mimosa | 0.03 | 8.0 | 41.2 | 20.7 |
| 90 | | | 0.06 | 5.1 | 43.8 | 19.6 |
| 91 | | | 0.10 | 2.6 | 46.4 | 18.2 |
| 92 | | Pyrogallol | 0.10 | 5.3 | 43.8 | 19.5 |
| 93 | | Ellagic Acid | 0.10 | 5.9 | 43.1 | 19.8 |

In Comparative Example 44, the same processes as those in Example 72 were performed except that the digestion accelerator was not added. Then, the residual rate of the wood chips and the yield rate and Kappa number of the pulp were determined. Table 13 shows the results.

TABLE 13

| Comp. Ex. | Black Liquor Used | Digestion Accelerator | Amount Used (mass %/Wood Chips) | Residual Rate of Wood Pieces (%) | Yield Rate of Pulp (%) | Kappa Number of Pulp |
|---|---|---|---|---|---|---|
| 44 | Black Liquor obtained in Com. Ex. 12 | None | None | 16.8 | 32.8 | 25.5 |
| 45 | | Glycolic Acid | 0.10 | 14.0 | 35.7 | 23.5 |
| 46 | | | 0.20 | 11.9 | 37.3 | 22.6 |
| 47 | | DL-Malic Acid | 0.10 | 13.8 | 35.9 | 23.4 |
| 48 | | | 0.20 | 11.0 | 38.7 | 22.0 |

In Comparative Examples 45 to 48, the same processes as those in Example 72 were performed except that compounds shown in Table 13 were used as a digestion accelerator in the amounts shown in Table 13. Then, the residual rates of the wood chips, and the yield rates and Kappa numbers of the pulp were determined. Table 13 shows the results. Table 13 shows the results of Comparative Examples obtained by the kraft process using the black liquor after the digestion by the kraft process without using the digestion accelerator using the hardwood.

In Comparative Example 49, the same processes as those in Example 72 were performed except that the wood chips were changed to softwood, and the digestion accelerator was not added. Then, the residual rate of the wood chips and the yield rate and Kappa number of the pulp were determined. Table 14 shows the results.

TABLE 14

| Comp. Ex. | Black Liquor Used | Digestion Accelerator | Amount Used (mass %/Wood Chips) | Residual Rate of Wood Pieces (%) | Yield Rate of Pulp | Kappa Number of Pulp |
|---|---|---|---|---|---|---|
| 49 | Black Liquor obtained in Comp. Ex. 12 | None | None | 16.9 | 32.4 | 25.7 |
| 50 | | Glycolic Acid | 0.10 | 14.1 | 35.0 | 23.6 |
| 51 | | | 0.20 | 12.0 | 37.3 | 22.8 |
| 52 | | Lithium Lactate | 0.10 | 15.0 | 34.3 | 24.5 |
| 53 | | | 0.20 | 12.6 | 36.5 | 23.2 |

In Comparative Examples 50 to 53, the same processes as those in Example 72 were performed except that the wood chips were changed to softwood, and compounds shown in Table 14 were used as a digestion accelerator in the amounts shown in Table 14. Then, the residual rates of the wood chips, and the yield rates and Kappa numbers of the pulp were determined. Table 14 shows the results. Table 14 shows the results of Comparative Examples obtained by the kraft process using the black liquor after the digestion by the kraft process without using the digestion accelerator using softwood.

Examples each using a digestion accelerator according to the present invention containing tannin or a polyphenol compound that is a hydrolysate of the tannin, a salt of the polyphenol compound, or ester of the polyphenol compound all exhibited higher digestion acceleration effects in the digestion accelerator according to the present invention containing tannin or a polyphenol compound that is a hydrolysate of the tannin, a salt of the polyphenol compound, or ester of the polyphenol compound even after various digestion processes such as alkali digestion, kraft digestion, polysulfide digestion, and kraft digestion where air is mixed, and digestion using a black liquor after digestion of wood. In contrast, the digestion acceleration effect was really low when aliphatic hydroxy carboxylic acids such as glycolic acid, DL-malic acid, tripotassium citrate, and lithium lactate were added in the digestion step.

The above-described embodiment is a mere example of the present invention, and the present invention is not limited to the example. Well-known techniques, conventional techniques, and known techniques may be combined with or partially replaced with the example. Further, modifications that can be easily conceived by those skilled in the art are also encompassed in the present invention.

The invention claimed is:

1. A method for manufacturing pulp comprising a digestion step of a lignocellulose material including adding tannin, wherein the amount of tannin added in the digestion step is 50 ppm or more to 1000 ppm or less relative to a mass of the lignocellulose material, wherein the digestion step comprises introducing oxygen such that an oxygen partial pressure of the digestion step is 0.05-1 MPa.

2. The method of claim 1, wherein the temperature of the digestion step is 80-250° C.

3. The method of claim 1, wherein the pressure of the digestion step is normal pressure to 5 MPa.

4. The method of claim 1, wherein the oxygen partial pressure of the digestion step is 0.1-0.3 MPa.

5. A method for manufacturing pulp comprising a digestion step comprising adding a digestion accelerator to a mixture comprising wood chips, wherein the digestion accelerator comprises an extract of at least one selected from the group consisting of chestnut, quebracho, mimosa, tara, tea, Chinese gall, gallnuts, myrabolam, gambier, and persimmon, wherein the extract comprises a tannin.

6. The method of claim 5, wherein the digestion accelerator comprises the extract of chestnut and the solution comprises 0.03-0.2 mass % the extract of chestnut relative to the wood chips.

7. The method of claim 5, wherein the digestion accelerator comprises the extract of quebracho and the solution comprises 0.03-0.2 mass % the extract of quebracho relative to the wood chips.

* * * * *